US007590529B2

(12) United States Patent
Zhang et al.

(10) Patent No.: US 7,590,529 B2
(45) Date of Patent: Sep. 15, 2009

(54) METHOD AND APPARATUS FOR REDUCING NOISE CORRUPTION FROM AN ALTERNATIVE SENSOR SIGNAL DURING MULTI-SENSORY SPEECH ENHANCEMENT

(75) Inventors: Zhengyou Zhang, Bellevue, WA (US); Amarnag Subramanya, Seattle, WA (US); James G. Droppo, Duvall, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 762 days.

(21) Appl. No.: 11/050,936

(22) Filed: Feb. 4, 2005

(65) Prior Publication Data

US 2006/0178880 A1 Aug. 10, 2006

(51) Int. Cl.
*G10L 21/02* (2006.01)
*G10L 15/20* (2006.01)

(52) U.S. Cl. ........................................ 704/226; 704/233

(58) Field of Classification Search ................. 704/226, 704/227, 228; 381/71.1, 71.2, 71.9
See application file for complete search history.

(56) References Cited

U.S. PATENT DOCUMENTS 3,947,636 A * 3/1976 Edgar ........................ 381/94.4
4,052,568 A * 10/1977 Jankowski .................. 704/233
5,590,241 A * 12/1996 Park et al. .................... 704/227
5,933,506 A * 8/1999 Aoki et al. .................. 381/151
6,327,564 B1 * 12/2001 Gelin et al. ................. 704/233
6,480,823 B1 * 11/2002 Zhao et al. .................. 704/226
6,882,736 B2 * 4/2005 Dickel et al. ................ 381/317
6,959,276 B2 * 10/2005 Droppo et al. .............. 704/226
7,103,540 B2 * 9/2006 Droppo et al. .............. 704/226
7,117,148 B2 * 10/2006 Droppo et al. .............. 704/228
7,181,390 B2 * 2/2007 Droppo et al. .............. 704/226
2002/0039425 A1 * 4/2002 Burnett et al. ............. 381/94.7
2003/0040908 A1 2/2003 Yang et al.
2003/0061037 A1 * 3/2003 Droppo et al. .............. 704/226

OTHER PUBLICATIONS

"Direct Filtering for Air-and Bone-Conductive Microphones," Zicheng Liu et al., Multimedia Signal Processing, 2004, IEEE 6$^{th}$ Workshop on Siena, Italy, pp. 363-366.
"Air-and Bone-Conductive Integrated Microphones for Robust Speech Detection and Enhancement," Yanli Zheng et al., Automatic Speech Recognition and Understanding, 2003, 249-254.
European Search Report from Appln No. 06100071.7, filed Jan. 4, 2006.

* cited by examiner

*Primary Examiner*—Richemond Dorvil
*Assistant Examiner*—Douglas C Godbold
(74) *Attorney, Agent, or Firm*—Theodore M. Magee; Westman, Champlin & Kelly, P.A.

(57) ABSTRACT

A method and apparatus classify a portion of an alternative sensor signal as either containing noise or not containing noise. The portions of the alternative sensor signal that are classified as containing noise are not used to estimate a portion of a clean speech signal and the channel response associated with the alternative sensor. The portions of the alternative sensor signal that are classified as not containing noise are used to estimate a portion of a clean speech signal and the channel response associated with the alternative sensor.

11 Claims, 6 Drawing Sheets

METHOD AND APPARATUS FOR REDUCING NOISE CORRUPTION FROM AN ALTERNATIVE SENSOR SIGNAL DURING MULTI-SENSORY SPEECH ENHANCEMENT

BACKGROUND OF THE INVENTION

The present invention relates to noise reduction. In particular, the present invention relates to removing noise from speech signals.

A common problem in speech recognition and speech transmission is the corruption of the speech signal by additive noise. In particular, corruption due to the speech of another speaker has proven to be difficult to detect and/or correct.

Recently, a system has been developed that attempts to remove noise by using a combination of an alternative sensor, such as a bone conduction microphone, and an air conduction microphone. This system estimates channel responses associated with the transmission of speech and noise through the bone conduction microphone. These channel responses are then used in a direct filtering technique to identify an estimate of the clean speech signal based on a noisy bone conduction microphone signal and a noisy air conduction microphone signal.

Although this system works well, it tends to introduce nulls into the speech signal at higher frequencies and also tends to include annoying clicks in the estimated clean speech signal if the user clacks teeth during speech. Thus, a system is needed that improves the direct filtering technique to remove the annoying clicks and improve the clean speech estimate.

SUMMARY OF THE INVENTION

A method and apparatus classify a portion of an alternative sensor signal as either containing noise or not containing noise. The portions of the alternative sensor signal that are classified as containing noise are not used to estimate a portion of a clean speech signal and the channel response associated with the alternative sensor. The portions of the alternative sensor signal that are classified as not containing noise are used to estimate a portion of a clean speech signal and the channel response associated with the alternative sensor.

DETAILED DESCRIPTION OF ILLUSTRATIVE EMBODIMENTS

Figure 1:
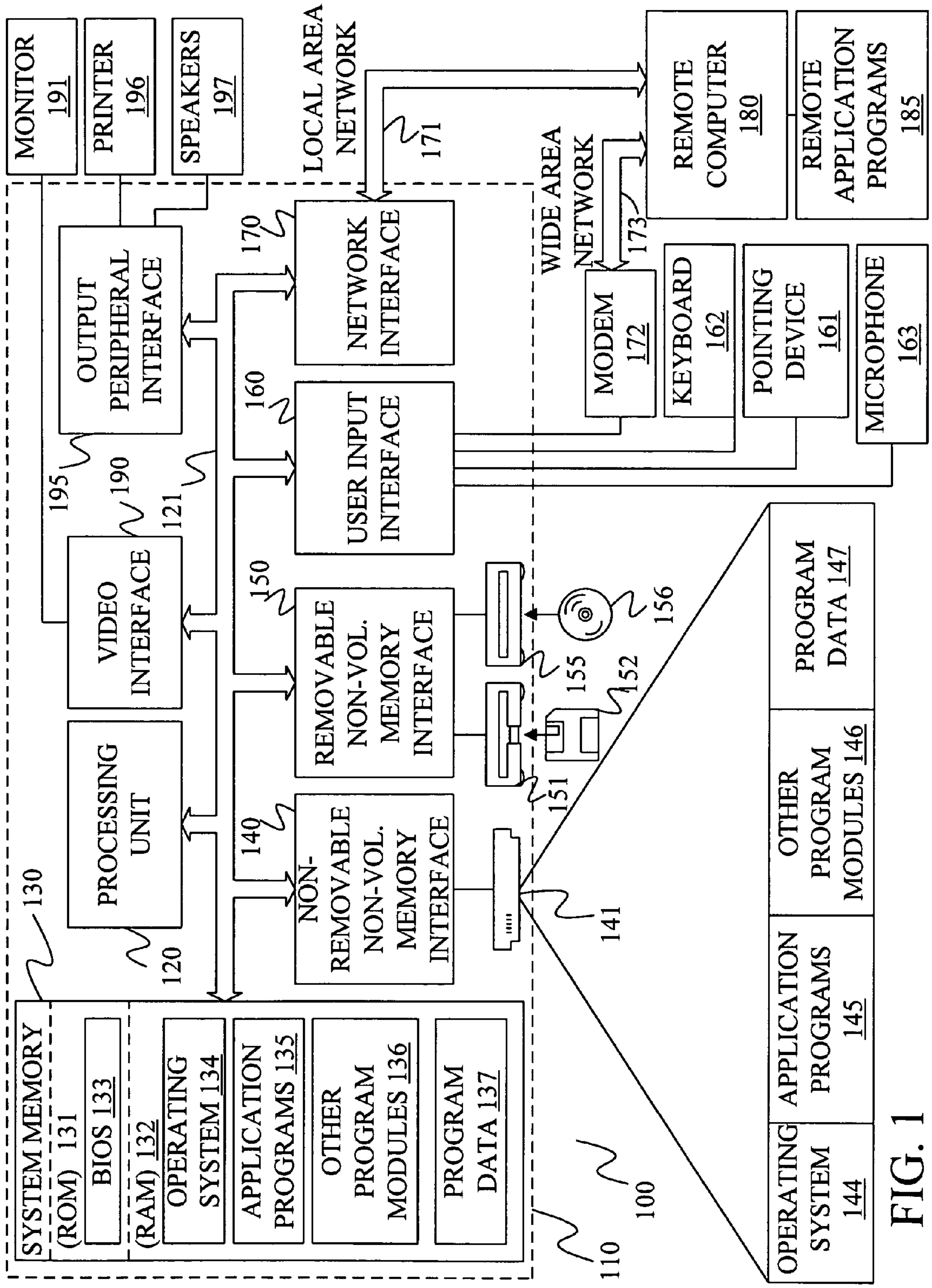
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
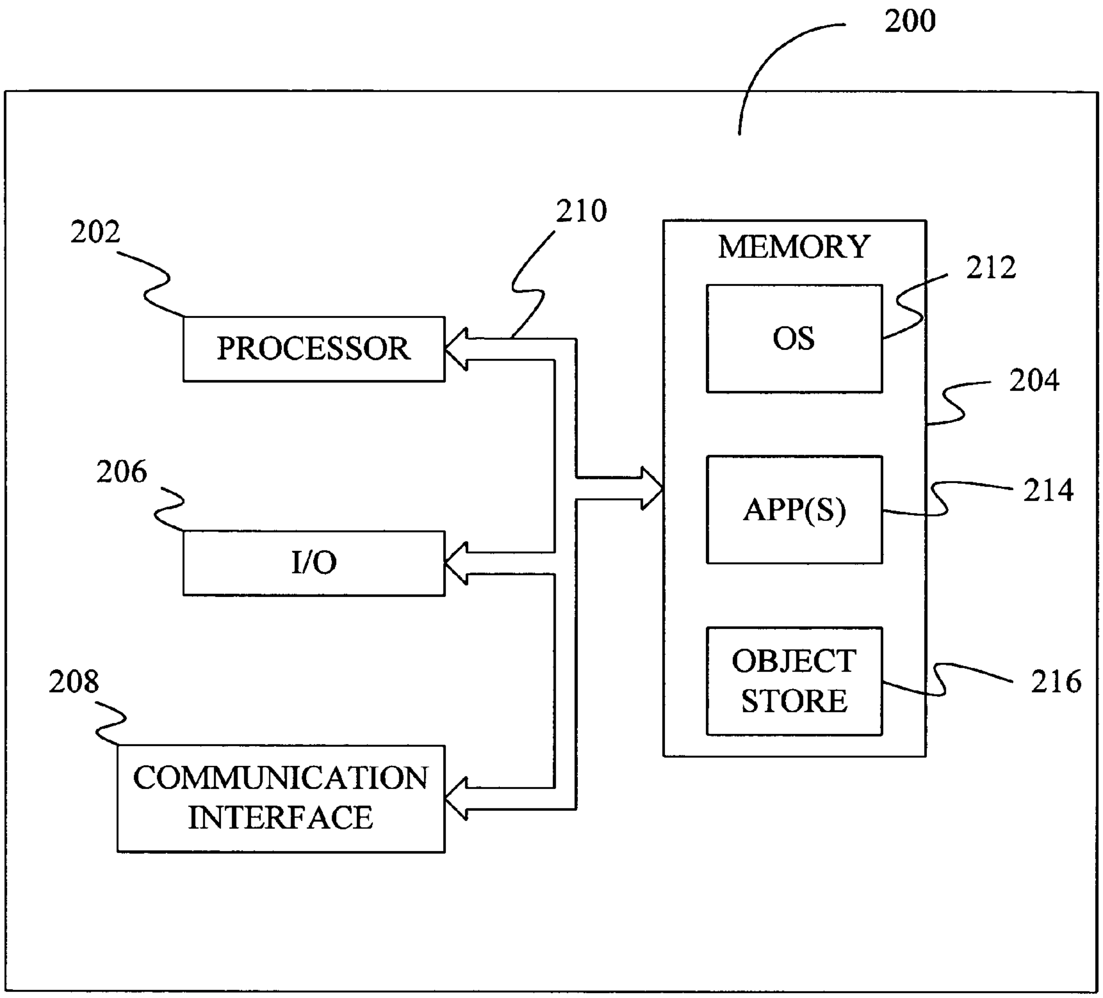
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
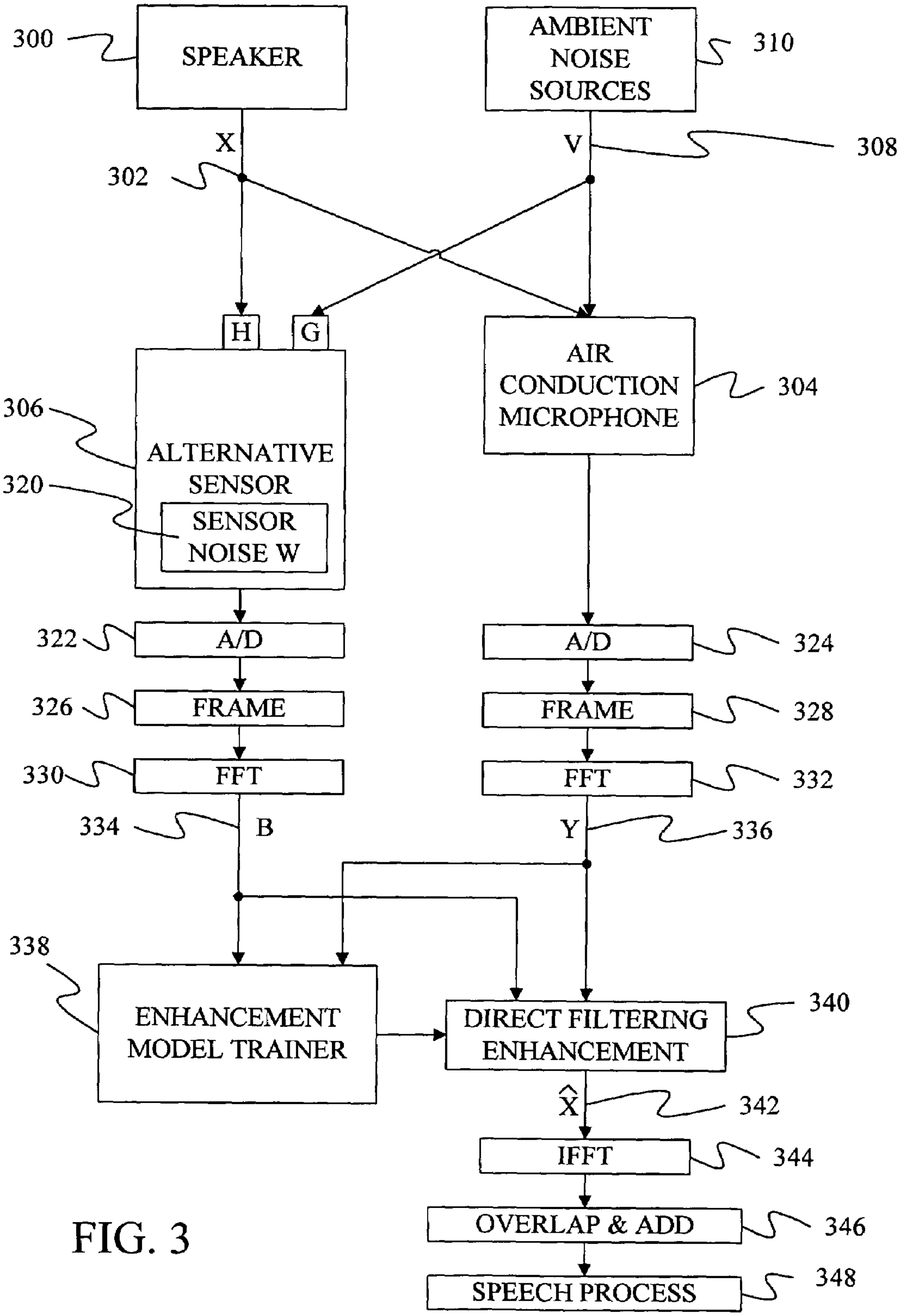
FIG. 3 is a block diagram of a speech enhancement system of the present invention.

FIG. 3 provides a block diagram of a speech enhancement system for embodiments of the present invention. In FIG. 3, a user/speaker 300 generates a speech signal 302 (X) that is detected by an air conduction microphone 304 and an alternative sensor 306. Examples of alternative sensors include a throat microphone that measures the user's throat vibrations, a bone conduction sensor that is located on or adjacent to a facial or skull bone of the user (such as the jaw bone) or in the ear of the user and that senses vibrations of the skull and jaw that correspond to speech generated by the user. Air conduction microphone 304 is the type of microphone that is commonly used to convert audio air-waves into electrical signals.

Air conduction microphone 304 also receives ambient noise 308 (V) generated by one or more noise sources 310. Depending on the type of alternative sensor and the level of the noise, noise 308 may also be detected by alternative sensor 306. However, under embodiments of the present invention, alternative sensor 306 is typically less sensitive to ambient noise than air conduction microphone 304. Thus, the alternative sensor signal generated by alternative sensor 306 generally includes less noise than air conduction microphone signal generated by air conduction microphone 304. Although alternative sensor 306 is less sensitive to ambient noise, it does generate some sensor noise 320 (W).

The path from speaker 300 to alternative sensor signal 316 can be modeled as a channel having a channel response H. The path from ambient noise sources 310 to alternative sensor signal 316 can be modeled as a channel having a channel response G.

The alternative sensor signal from alternative sensor 306 and the air conduction microphone signal from air conduction microphone 304 are provided to analog-to-digital converters 322 and 324, respectively, to generate a sequence of digital values, which are grouped into frames of values by frame constructors 326 and 328, respectively. In one embodiment, A-to-D converters 322 and 324 sample the analog signals at 16 kHz and 16 bits per sample, thereby creating 32 kilobytes of speech data per second and frame constructors 326 and 328 create a new respective frame every 10 milliseconds that includes 20 milliseconds worth of data.

Each respective frame of data provided by frame constructors 326 and 328 is converted into the frequency domain using Fast Fourier Transforms (FFT) 330 and 332, respectively. This results in frequency domain values 334 (B) for the alternative sensor signal and frequency domain values 336 (Y) for the air conduction microphone signal.

The frequency domain values for the alternative sensor signal 334 and the air conduction microphone signal 336 are provided to enhancement model trainer 338 and direct filtering enhancement unit 340. Enhancement model trainer 338 trains model parameters that describe the channel responses H and G as well as ambient noise V and sensor noise W based on alternative sensor values B and air conduction microphone values Y. These model parameters are provided to direct filtering enhancement unit 340, which uses the parameters and the frequency domain values B and Y to estimate clean speech signal 342 ($\hat{X}$).

Clean speech estimate 342 is a set of frequency domain values. These values are converted to the time domain using an Inverse Fast Fourier Transform 344. Each frame of time domain values is overlapped and added with its neighboring frames by an overlap-and-add unit 346. This produces a continuous set of time domain values that are provided to a speech process 348, which may include speech coding or speech recognition.

The present inventors have found that the system for identifying clean signal estimates shown in FIG. 3 can be adversely affected by transient noise, such as teeth clack, that is detected more by alternative sensor 306 than by air conduction microphone 304. The present inventors have found that such transient noise corrupts the estimate of the channel response H, causing nulls in the clean signal estimates. In addition, when an alternative sensor value B is corrupted by such transient noise, it causes the clean speech value that is estimated from that alternative sensor value to also be corrupted.

The present invention provides direct filtering techniques for estimating clean speech signal 342 that avoids corruption of the clean speech estimate caused by transient noise in the alternative sensor signal such as teeth clack. In the discussion below, this transient noise is referred to as teeth clack to avoid confusion with other types of noise found in the system. However, those skilled in the art will recognize that the present invention may be used to identify clean signal values when the system is affected by any type of noise that is detected more by the alternative sensor than by the air conduction microphone.

Figure 4:
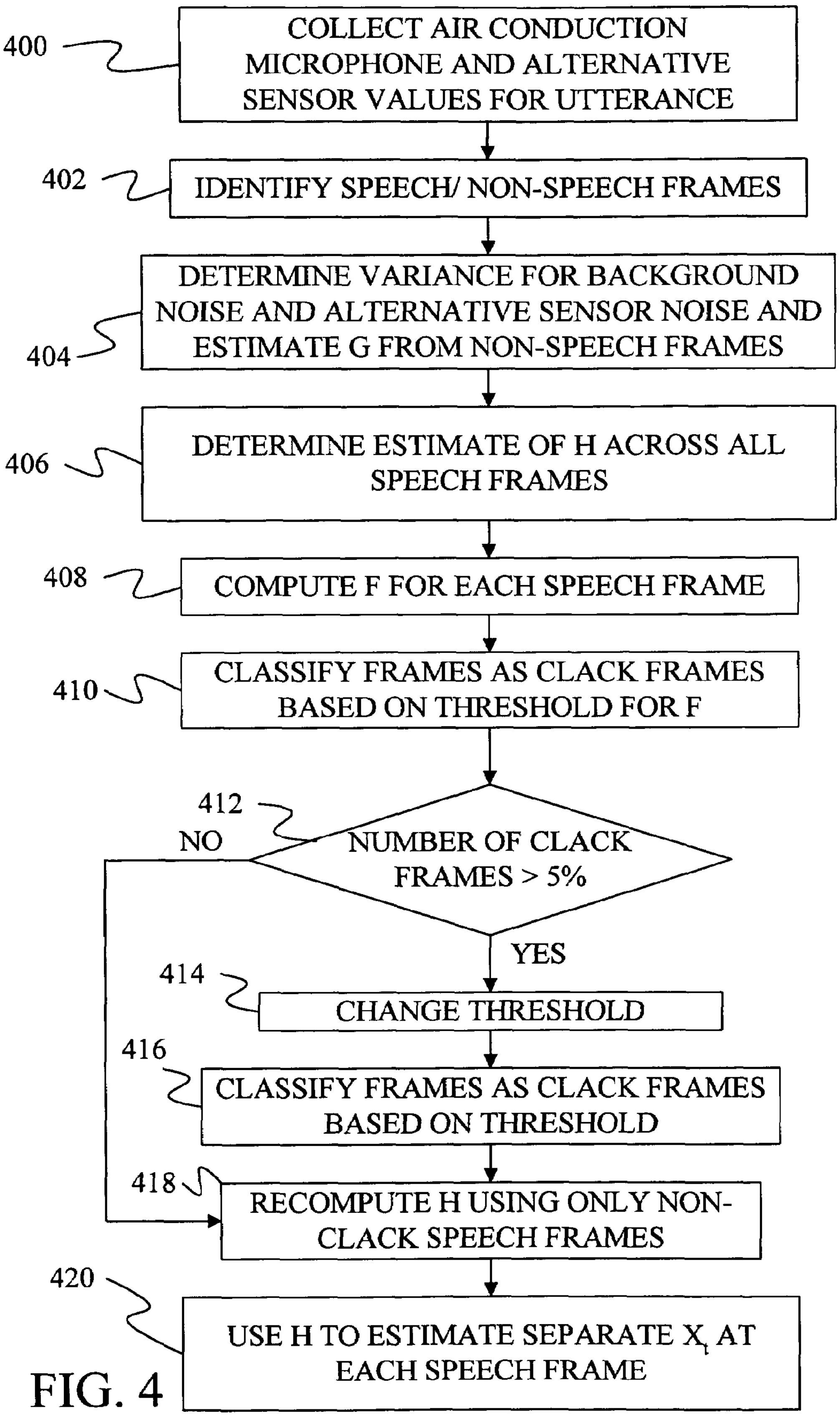
FIG. 4 is a flow diagram for enhancing speech under one embodiment of the present invention.

FIG. 4 provides a flow diagram of a batch update technique used to estimate clean speech values from noisy speech signals using techniques of the present invention.

In step 400, air conduction microphone values (Y) and alternative sensor values (B) are collected. These values are provided to enhancement model trainer 338.

Figure 5:
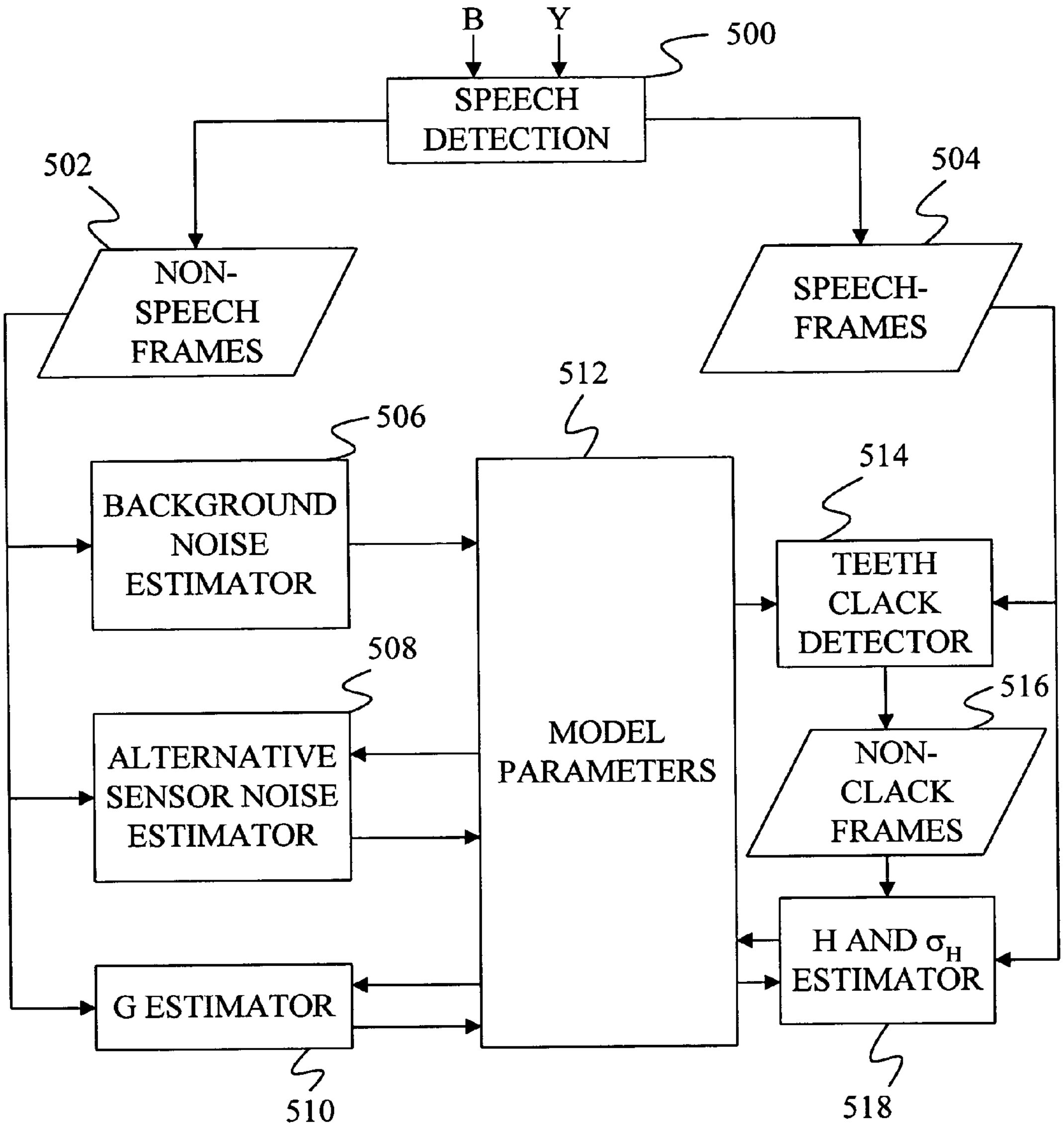
FIG. 5 is a block diagram of an enhancement model training system of one embodiment of the present invention.

FIG. 5 provides a block diagram of trainer 338. Within trainer 338, alternative sensor values (B) and air conduction microphone values (Y) are provided to a speech detection unit 500.

Speech detection unit 500 determines which alternative sensor values and air conduction microphone values correspond to the user speaking and which values correspond to background noise, including background speech, at step 402.

Under one embodiment, speech detection unit 500 determines if a value corresponds to the user speaking by identifying low energy portions of the alternative sensor signal, since the energy of the alternative sensor noise is much smaller than the speech signal captured by the alternative sensor signal.

Specifically, speech detection unit 500 identifies the energy of the alternative sensor signal for each frame as represented by each alternative sensor value. Speech detection unit 500 then searches the sequence of frame energy values to find a peak in the energy. It then searches for a valley after the peak. The energy of this valley is referred to as an energy separator, d. To determine if a frame contains speech, the ratio, k, of the energy of the frame, e, over the energy separator, d, is then determined as: k=e/d. A speech confidence, q, for the frame is then determined as:

$$q = \begin{cases} 0: & k < 1 \\ \dfrac{k-1}{\alpha-1}: & 1 \le k \le \alpha \\ 1: & k > \alpha \end{cases} \qquad \text{EQ. 1}$$

where α defines the transition between two states and in one implementation is set to 2. Finally, the average confidence value of the 5 neighboring frames (including itself) is used as the final confidence value for the frame.

Under one embodiment, a fixed threshold value is used to determine if speech is present such that if the confidence value exceeds the threshold, the frame is considered to contain speech and if the confidence value does not exceed the threshold, the frame is considered to contain non-speech. Under one embodiment, a threshold value of 0.1 is used.

In other embodiments, known speech detection techniques may be applied to the air conduction speech signal to identify when the speaker is speaking. Typically, such systems use pitch trackers to identify speech frames, since such frames usually contain harmonics that are not present in non-speech.

Alternative sensor values and air conduction microphone values that are associated with speech are stored as speech frames 504 and values that are associated with non-speech are stored as non-speech frames 502.

Using the values in non-speech frames 502, a background noise estimator 506, an alternative sensor noise estimator 508 and a channel response estimator 510, estimate model parameters that describe the background noise, the alternative sensor noise, and the channel response G, respectively, at step 404.

Under one embodiment, the real and imaginary parts of the background noise, V, and the real and imaginary parts of the sensor noise, W, are modeled as independent zero-mean Gaussians such that:

$$V=N(O,\sigma_v^2) \qquad \text{Eq. 2}$$

$$W=N(O,\sigma_w^2) \qquad \text{Eq. 3}$$

where $\sigma_v^2$ is the variance for background noise V and $\sigma_w^2$ is the variance for sensor noise W.

The variance for the background noise, $\sigma_v^2$, is estimated from values of the air conduction microphone during the non-speech frames. Specifically, the air conduction microphone values Y during non-speech are assumed to be equal to the background noise, V. Thus, the values of the air conduction microphone Y can be used to determine the variance $\sigma_v^2$, assuming that the values of Y are modeled as a zero mean Gaussian during non-speech. Under one embodiment, this variance is determined by dividing the sum of squares of the values Y by the number of values.

The variance for the alternative sensor noise, $\sigma_w^2$, can be determined from the non-speech frames by estimating the sensor noise $W_t$ at each frame of non-speech as:

$$W_t=B_t-GY_t \qquad \text{Eq. 4}$$

where G is initially estimated to be zero, but is updated through an iterative process in which $\sigma_w^2$ is estimated during one step of the iteration and G is estimated during the second step of the iteration. The values of $W_t$ are then used to estimate the variance $\sigma_w^2$ assuming a zero mean Gaussian model for W.

G estimator 510, estimates the channel response G during the second step of the iteration as:

$$G=\frac{\sum_{t=1}^{D}(\sigma_v^2|B_t|^2-\sigma_w^2|Y_t|^2)\pm\sqrt{\left(\sum_{t=1}^{D}(\sigma_v^2|B_t|^2-\sigma_w^2|Y_t|^2)\right)^2+4\sigma_v^2\sigma_w^2\left|\sum_{t=1}^{D}B_t^*Y_t\right|^2}}{2\sigma_v^2\sum_{t=1}^{D}B_t^*Y_t} \qquad \text{Eq. 5}$$

Where D is the number of frames in which the user is not speaking. In Equation 5, it is assumed that G remains constant through all frames of the utterance and thus is not dependent on the time frame t.

Equations 4 and 5 are iterated until the values for $\sigma_w^2$ and G converge on stable values. The final values for $\sigma_v^2$, $\sigma_w^2$, and G are stored in model parameters 512.

At step 406, model parameters for the channel response H are initially estimated by H and $\sigma_H^2$ estimator 518 using the model parameters for the noise stored in model parameters 512 and the values of B and Y in speech frames 504. Specifically, H is estimated as:

$$H=\frac{\sum_{t=1}^{S}(\sigma_v^2|B_t|-\sigma_w^2|Y_t|^2)+\sqrt{\left(\sum_{t=1}^{S}(\sigma_v^2|B_t|^2-\sigma_w^2|Y_t|^2)\right)^2+4\sigma_v^2\sigma_w^2\left|\sum_{t=1}^{S}B_t^*Y_t\right|^2}}{2\sigma_v^2\sum_{t=1}^{S}B_t^*Y_t} \qquad \text{Eq. 6}$$

where S is the number of speech frames and G is assumed to be zero during the computation of H.

In addition, the variance of a prior model of H, $\sigma_H^2$, is determined at step 406. The value of $\sigma_H^2$ can be computed as:

$$\sigma_H^2=\sum_{t=1}^{S}\left|\frac{\partial H}{\partial Y_t}\right|^2\sigma_v^2+\left|\frac{\partial H}{\partial B_t}\right|^2\sigma_w^2 \qquad \text{Eq. 7}$$

Under some embodiments, $\sigma_H^2$ is instead estimated as a percentage of $H^2$. For example:

$$\sigma_H^2=0.01H^2 \qquad \text{Eq. 8}$$

Once the values for H and $\sigma_H^2$ have been determined at step 406, these values are used to determine the value of a discriminant function for each speech frame 504 at step 408. Specifically, for each speech frame, teeth clack detector 514 determines the value of:

$$F_t=\sum_{k=1}^{K}\frac{|B_t-HY_t|^2}{\sigma_w^2+\sigma_v^2|H|^2+\sigma_H^2|Y|^2} \qquad \text{Eq. 9}$$

where K is the number of frequency components in the frequency domain values of $B_t$ and $Y_t$.

The present inventors have found that a large value for $F_t$ indicates that the speech frame contains a teeth clack, while lower values for $F_t$ indicate that the speech frame does not contain a teeth clack. Thus, the speech frames can be classified as teeth clack frames using a simple threshold. This is shown as step 410 of FIG. 4.

Under one embodiment, the threshold for F is determined by modeling F as a chi-squared distribution with an acceptable error rate. In terms of an equation:

$$P(F_t<\epsilon|\Psi)=\alpha \qquad \text{Eq. 10}$$

where $P(F<\epsilon|\Psi)$ is the probability that $F_t$ is less than the threshold $\epsilon$ given the hypothesis $\Psi$ that this frame is not a teeth clack frame, and $\alpha$ is the acceptable error-free rate.

Under one embodiment, $\alpha$=0.99. In otherwords, this model will classify a speech frame as a teeth clack frame when the frame actually does not contain a teeth clack only 1% of the time. Using that error rate, the threshold for F becomes $\epsilon$=365.3650 based on published values for chi-squared distributions. Note that other error-free rates resulting in other thresholds can be used within the scope of the present invention.

Using the threshold determined from the chi-squared distribution, each of the frames is classified as either a teeth clack frame or a non-teeth clack frame at step 410. Because F is dependent on the variance of the background noise and the variance of the sensor noise, the classification is sensitive to errors in determining the values of those variances. To ensure that errors in the variances do not cause too many frames to be classified as containing teeth clacks, teeth clack detector 514 determines the percentage of frames that are initially classified as containing teeth clack. If the percentage is greater than a selected percentage, such as 5% at step 412, the threshold is increased at step 414 and the frames are reclassified at step 416 such that only the selected percentage of frames are identified as containing teeth clack. Although a percentage of frames is used above, a fixed number of frames may be used instead.

Once fewer than the selected percentage of frames have been identified as containing teeth clack, either at step 412 or step 416, the frames that are classified as non-clack frames 516 are provided to H and $\sigma_H^2$ estimator 518 to recomputed the values of H and $\sigma_H^2$. Specifically, equation 6 is recomputed using the values of $B_t$ and $Y_t$ that are found in non-clack frames 516.

At step 420, the updated value of H is used with the value of G and the values of the noise variances $\sigma_v^2$ and $\sigma_w^2$ by direct filtering enhancement unit 340 to estimate the clean speech value as:

$$X_t = \frac{1}{\sigma_w^2 + \sigma_v^2|H-G|^2}(\sigma_w^2 Y_t + \sigma_v^2 H^*(B_t - GY_t)) \quad \text{Eq. 11}$$

where H* represent the complex conjugate of H. For frames that are classified as containing teeth clacks, the value of $B_t$ is corrupted by the teeth clack and should not be used to estimate the clean speech signal. For such frames, $B_t$ is estimated as $B_t \approx HY_t$ in equation 11. The classification of frames as containing speech and as containing teeth clack is provided to direct filtering enhancement 340 by enhancement model trainer 338 so that this substitution can be made in equation 10.

By estimating H using only those frames that do not include teeth clack, the present invention provides a better estimate of H. This helps to reduce nulls that had been present in the higher frequencies of the clean signal estimates of the prior art. In addition, by not using the alternative sensor signal in those frames that contain teeth clack, the present invention provides a better estimate of the clean speech values for those frames.

Figure 6:
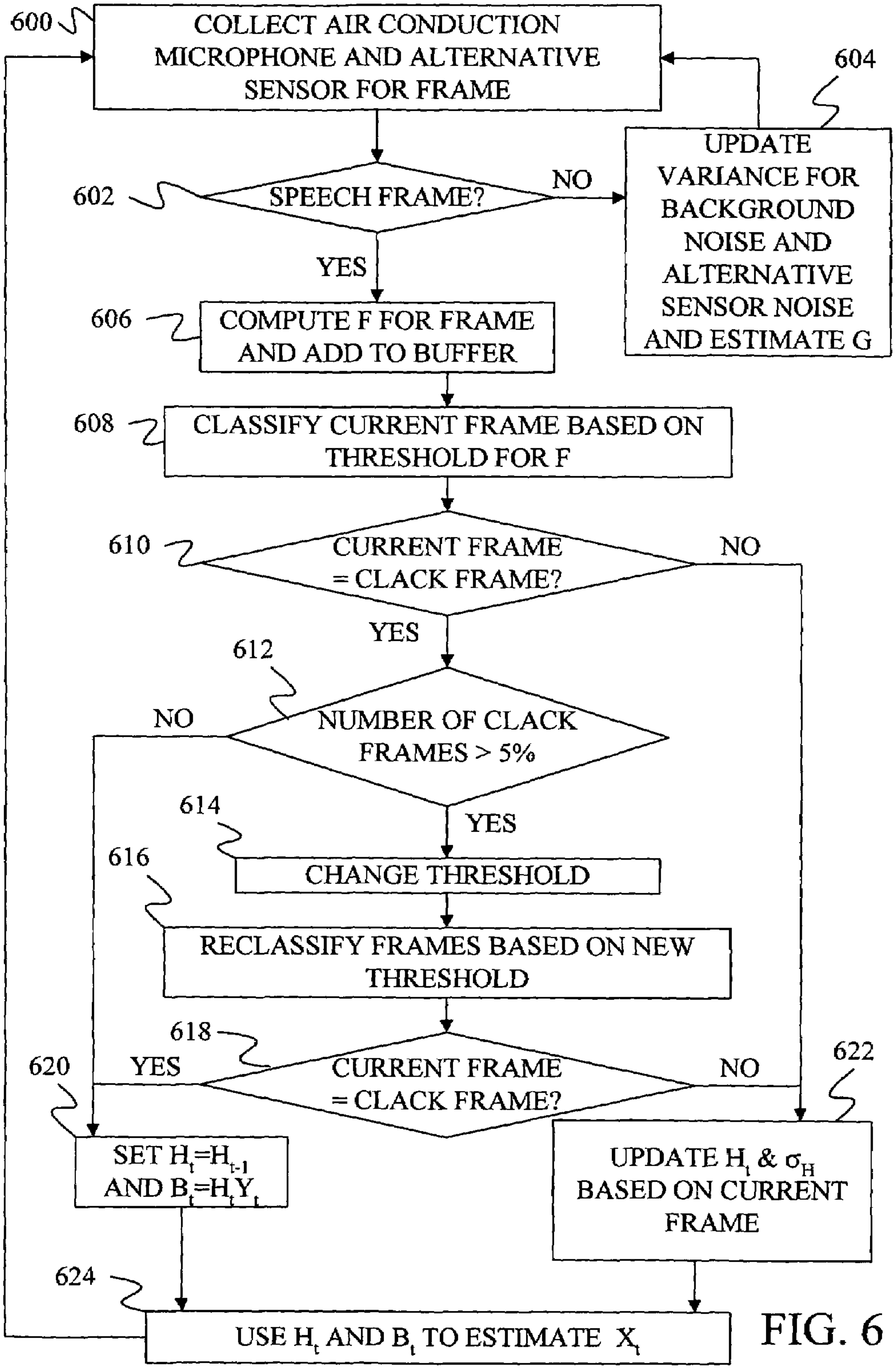
FIG. 6 is a flow diagram for enhancing speech under another embodiment of the present invention.

The flow diagram of FIG. 4 represents a batch update of the channel responses and the classification of the frames as containing teeth clacks. This batch update is performed across an entire utterance. FIG. 6 provides a flow diagram of a continuous or "online" method for updating the channel response values and estimating the clean speech signal.

In step 600 of FIG. 6, an air conduction microphone value, $Y_t$, and an alternative sensor value, $B_t$, are collected for the frame. At step 602, speech detection unit 500 determines if the frame contains speech. The same techniques that are described above may be used to make this determination. If the frame does not contain speech, the variance for the background noise, the variance for the alternative sensor noise and the estimate of G are updated at step 604. Specifically, the variances are updated as:

$$\sigma_{v,d}^2 = \frac{\sigma_{v,d-1}^2 \cdot (d-2) + |Y_t|^2}{(d-1)} \quad \text{Eq. 12}$$

$$\sigma_{w,d}^2 = \frac{\sigma_{w,d-1}^2 \cdot (d-2) + |B_t - G_{d-1}Y_t|^2}{(d-1)} \quad \text{Eq. 13}$$

where d is the number of non-speech frames that have been processed, and $G_{d-1}$ is the value of G before the current frame.

The value of G is updated as:

$$G_d = \frac{J(d) \pm \sqrt{(J(d))^2 + 4\sigma_v^2\sigma_w^2|K(d)|^2}}{2\sigma_v^2 K(d)} \quad \text{Eq. 14}$$

where:

$$J(d) = cJ(d-1) + (\sigma_v^2|B_T|^2 - \sigma_w^2|Y_T|^2) \quad \text{Eq. 15}$$

$$K(d) = cK(d-1) + B_T^* Y_T \quad \text{Eq. 16}$$

where c≦1, provides an effective history length.

If the current frame is a speech frame, the value of F is computed using equation 9 above at step 606. This value of F is added to a buffer containing values of F for past frames and the classification of those frames as either clack or non-clack frames.

Using the value of F for the current frame and a threshold for F for teeth clacks, the current frame is classified as either a teeth clack frame or a non-teeth clack frame at step 608. This threshold is initially set using the chi-squared distribution model described above. The threshold is updated with each new frame as discussed further below.

If the current frame has been classified as a clack frame at step 610, the number of frames in the buffer that have been classified as clack frames is counted to determine if the percentage of clack frames in the buffer exceeds a selected percentage of the total number of frames in the buffer at step 612.

If the percentage of clack frames exceeds the selected percentage, shown as five percent in FIG. 6, the threshold for F is increased at step 614 so that the selected percentage of the frames are classified as clack frames. The frames in the buffer are then reclassified using the new threshold at step 616.

If the current frame is a clack frame at step 618, or if the percentage of clack frames does not exceed the selected percentage of the total number of frames at step 612, the current frame should not be used to adjust the parameters of the H channel response model and the value of the alternative sensor should not be used to estimate the clean speech value. Thus, at step 620, the channel response parameters for H are set equal to their value determined from a previous frame before the current frame and the alternative sensor value $B_t$ is estimated as $B_t \approx HY_t$. These values of H and $B_t$ are then used in step 624 to estimate the clean speech value using equation 11 above.

If the current frame is not a teeth clack frame at either step 610 or step 618, the model parameters for channel response H are updated based on the values of $B_t$ and $Y_t$ for the current frame at step 622. Specifically, the values are updated as:

$$H_t = \frac{J(t) \pm \sqrt{(J(t))^2 + 4\sigma_v^2\sigma_w^2|K(t)|^2}}{2\sigma_v^2 K(t)} \quad \text{Eq. 17}$$

where:

$$J(t) = cJ(t-1) + (\sigma_v^2|B_T|^2 - \sigma_w^2|Y_T|^2) \quad \text{Eq. 18}$$

$$K(t) = cK(t-1) + B_T^* Y_T \quad \text{Eq. 19}$$

where J(t−1) and K(t−1) correspond to the values calculated for the previous non-teeth clack frame in the sequence of frames.

The variance of H is then updated as:

$$\sigma_H^2 = 0.01|H|^2 \quad \text{Eq. 20}$$

The new values of $\sigma_H^2$ and $H_t$ are then used to estimate the clean speech value at step 624 using equation 11 above. Since the alternative sensor value $B_t$ is not corrupted by teeth clack, the value determined from the alternative sensor is used directly in equation 11.

After the clean speech estimate has been determined at step 624, the next frame of speech is processed by returning to step 600. The process of FIG. 6 continues until there are no further frames of speech to process.

Under the method of FIG. 6, frames of speech that are corrupted by teeth clack are detected before estimating the channel response or the clean speech value. Using this detection system, the present invention is able to estimate the channel response without using frames that are corrupted by teeth clack. This helps to improve the channel response model thereby improving the clean signal estimate in non-teeth clack frames. In addition, the present invention does not use the alternative sensor values from teeth clack frames when estimating the clean speech value for those frames. This improves the clean speech estimate for teeth clack frames.

Although the present invention has been described with reference to particular embodiments, workers skilled in the art will recognize that changes may be made in form and detail without departing from the spirit and scope of the invention.

What is claimed is:

1. A method of determining an estimate for a noise-reduced value representing a portion of a noise-reduced speech signal, the method comprising:

generating frames of an alternative sensor signal using an alternative sensor other than an air conduction microphone;

generating frames of an air conduction microphone signal;

identifying frames of the alternative sensor signal that contain speech;

determining whether a frame of the alternative sensor signal that contains speech is corrupted by transient noise based in part on a frame of the air conduction microphone signal, wherein the transient noise is detected more by the alternative sensor than by the air conduction microphone by determining a value $F_t$ and comparing the value $F_t$ to a threshold value, where the value $F_t$ is determined as:

$$F_t = \sum_{k=1}^{K} \frac{|B_t - HY_t|^2}{\sigma_w^2 + \sigma_v^2|H|^2 + \sigma_H^2|Y_t|^2}$$

where K is the number of frequency components in the frequency domain values of the frame of the alternative sensor signal $B_t$ and the frame of the air conduction microphone signal $Y_t$, H is a channel response for a path from a speaker to the alternative sensor, $\sigma_w^2$ is a variance for sensor noise of the alternative sensor, $\sigma_v^2$ is variance for ambient noise and $\sigma_H^2$ is the variance of a prior model for the channel response H; and estimating the noise-reduced value based on the frame of the alternative sensor signal if the frame of the alternative sensor signal is determined to not be corrupted by transient noise.

2. The method of claim 1 further comprising not using the frame of the alternative sensor signal to estimate the noise-reduced value if the frame of the alternative sensor signal is determined to be corrupted by transient noise.

3. The method of claim 1 wherein estimating the noise-reduced value comprises using an estimate of a channel response associated with the alternative sensor.

4. The method of claim 3 further comprising updating the estimate of the channel response based only on frames of the alternative sensor signal that are determined to not be corrupted by transient noise.

5. The method of claim 1 wherein the threshold is based on a chi-squared distribution for the values of the function.

6. The method of claim 1 further comprising adjusting the threshold if more than a certain number of frames of the alternative sensor signal are determined to be corrupted by transient noise.

7. A computer-readable storage medium having stored thereon computer-executable instructions that when executed by a processor cause the processor to perform steps comprising:

receiving an air conduction microphone signal generated by an air conduction microphone;

receiving an alternative sensor signal generated by an alternative sensor other than an air conduction microphone where a noise is detected more by the alternative sensor than by the air conduction microphone;

setting a channel response for a channel representing a path from a speaker to the alternative sensor signal produced by an alternative sensor;

for each portion of the alternative sensor signal and corresponding portion of the air conduction microphone signal, determining a difference between the portion of the alternative sensor signal and a product of the portion of the air conduction microphone signal and the channel response;

for each portion of the alternative sensor signal, determining a value of a function based on the difference, where the value $F_t$ of the function is determined as:

$$F_t = \sum_{k=1}^{K} \frac{|B_t - HY_t|^2}{\sigma_w^2 + \sigma_v^2|H|^2 + \sigma_H^2|Y_t|^2}$$

where K is the number of frequency components in frequency domain values of the portion of the alternative sensor signal $B_t$ and the portion of the air conduction microphone signal $Y_t$, H is the channel response for the path from the speaker to the alternative sensor, $\sigma_w^2$ is a variance for sensor noise of the alternative sensor, $\sigma_v^2$ is a variance for ambient noise and $\sigma_H^2$ is a variance of a prior model for the channel response H;

classifying portions of the alternative sensor signal as either containing noise or not containing noise by comparing the value for each portion to a threshold;

using the portions of the alternative sensor signal that are classified as not containing noise to estimate clean speech values and replacing each portion of the alternative sensor signal that is classified as containing noise with the product of the channel response and the corresponding portion of the air conduction microphone signal to estimate clean speech values.

8. The computer-readable storage medium of claim 7 further comprising using a portion of the alternative sensor signal that is classified as not containing noise to estimate the channel response.

9. The computer-readable storage medium of claim 7 wherein calculating the value of the function comprises taking a sum over frequency components of the portion of the alternative sensor signal.

10. The computer-readable storage medium of claim 7 wherein the threshold value is determined from a chi-squared distribution.

11. The computer-readable storage medium of claim 7 wherein classifying portions of the alternative sensor signal comprises classifying a set of portions of the alternative sensor signal, and the steps further comprise determining that more than a selected percentage of the set of portions of the alternative sensor signal are classified as containing noise and adjusting the threshold so that no more than the selected percentage of the set of portions of the alternative sensor signal are classified as containing noise.

* * * * *